No. 731,674. PATENTED JUNE 23, 1903.
H. L. FINNELL.
DENTAL PLATE AND PROCESS OF MAKING SAME.
APPLICATION FILED JULY 17, 1901.
NO MODEL.
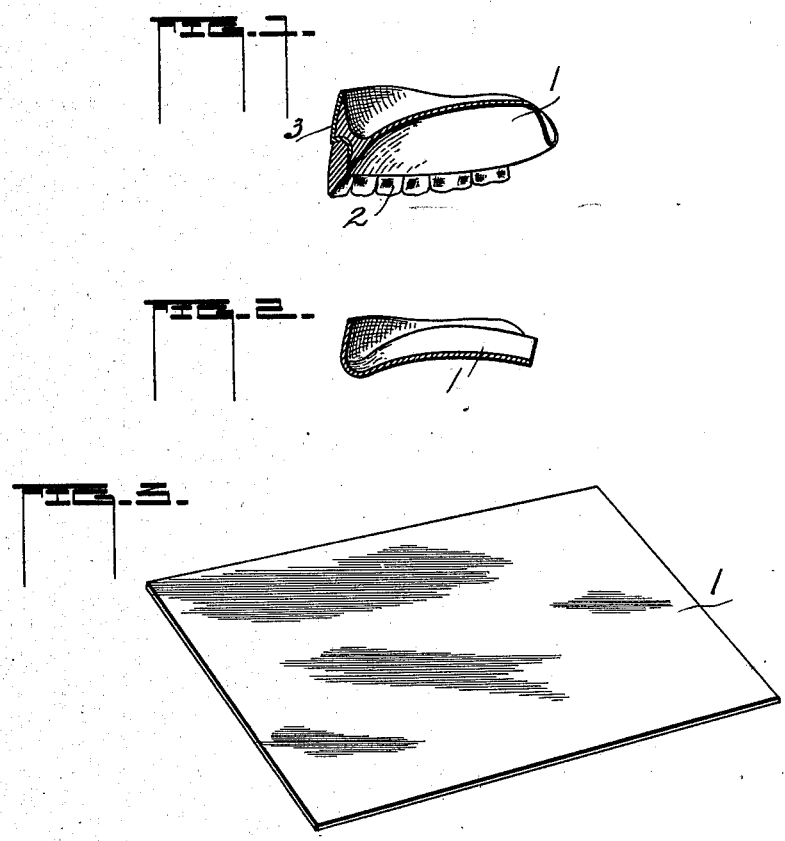

No. 731,674. Patented June 23, 1903.

UNITED STATES PATENT OFFICE.

HARRY L. FINNELL, OF PEORIA, ILLINOIS.

DENTAL PLATE AND PROCESS OF MAKING SAME.

SPECIFICATION forming part of Letters Patent No. 731,674, dated June 23, 1903.

Application filed July 17, 1901. Serial No. 68,653. (No model.)

*To all whom it may concern:*

Be it known that I, HARRY L. FINNELL, a citizen of the United States, residing in Peoria, in the county of Peoria and State of Illinois, have invented a new and useful Improvement in Dental Plates and Processes for Making the Same, of which the following is a specification.

This invention has reference to a plate for artificial teeth and to the process of manufacturing said plate; and the object which I have in view is the manufacture of plates for artificial teeth from what is known as "gutta-percha" rubber, an article known to the trade, and a further object being to render the process of making such plates more expeditious and considerably cheaper.

For a better understanding of my invention reference may be had to the accompanying drawings, in which—

Figure 1 is a sectional view illustrating a set of teeth set up in rubber. Fig. 2 is a sectional view of a plate as it is conformed to a plaster model and before any indentures are made or the gum put in place. Fig. 3 is a strip of rubber before treatment.

The method I employ is to use no wax whatever in the manufacture of my plate, but to use rubber throughout the entire process and treat the rubber with bisulfid of carbon.

I am aware that to treat rubber with bisulfid of carbon is not new; but in the manner in which I employ and use it I believe it to be new.

I will now proceed to describe each step in the process of manufacture of a plate such as I employ and for which protection is asked. I first take an impression of the mouth in plaster, obtain a model from this impression, then soapstone the model thoroughly, then wash the soapstone off with soapy water and dry the model with a cloth or by other suitable means. After such preliminary steps, some of which are in ordinary use, I take a sheet of rubber substantially similar to that which I intend to make my plate, referred to as 1, (see Fig. 3,) and treat it with bisulfid of carbon either by dipping it into the liquid or coating the same by means of a brush. The action of the bisulphid of carbon upon the rubber is to make a solvent or naphtha solution, and with this solution I paint the model with a good thick coat of same. This solution may be prepared in quantities and kept ready for use or made when making the artificial plate; all a matter of convenience. The model ready, a sheet of rubber with which it is intended to make the plate is dipped in the bisulfid of carbon and immediately thereafter submitted to the action of a flame to burn off the carbon for the purpose of making the sheet of rubber more plastic. The sheet is then dipped in dry sulfur and allowed to remain for one or two hours. The action of the sulfur is to make the sheet still more plastic. The sheet is then washed in a strong solution of alum-water for condensing the gutta-percha to take out moisture. The same is then thoroughly dried by wiping it, or by other suitable means. It is better to treat a quantity of the rubber with bisulfid of carbon and submit it to the action of a flame, dry sulfur, and alum-water, and then dried, which prepares the sheets for instant use. However, this is at the option of the user and may be employed in the most convenient manner. In the further carrying out of the process when it is desired to conform a sheet of this prepared rubber to a model for making a plate the sheet is first heated by dry heat for making the sheet very pliable and may be very easily adapted to the model and the same retained in such relation by cohesion, which is effected by the solution previously applied to the model and above described. This done and the teeth, referred to as 2, to be mounted are placed in the desired places on the plate, when the plate and teeth are dipped in alum-water, which tends to set the rubber and close up all cellular tissues, as by submitting the sheet of rubber to the action of the heat softens the said sheet the subsequent action of alum-water hardens it. The teeth are then removed from the model and plate, leaving an impression or die in the plate, or what is sometimes called a "casing" or "indenture," for the reception of the teeth. After such steps a sheet of pink dental rubber 3, which is to form the gum, is heated, together with the model-plate, and the pink dental sheet is laid on over the front of the gum and indentures previously formed and conformed to the model and such indentures. By heating the model-plate and pink rubber the same may be worked and kneaded as if it were wax, which permits the same to be adapted to the model and otherwise easily and readily handled.

In resetting the teeth after the gum has been placed they are heated slightly and then placed in the indentures previously made, forming a natural festoon. This done the plate is ready to be vulcanized and is flasked up and plastered or inclosed and the same vulcanized at 300° Fahrenheit. It takes about twenty-five minutes or thereabout to send it to 300°, and the same is held about fifty minutes at this temperature.

It is to be noted that by the use of rubber treated in the manner above stated for making it pliable the thickness of the plates may be graduated as desired if the sheets of rubber are of uniform thickness, and the rubber will be the same after the plate is finished as when it is first treated, something not heretofore possible without a great deal of trouble, and then not certain.

The old method of taking an impression of the mouth and making molds in which plates for artificial indentures are shaped is to take an impression of the mouth and place a base-plate of wax over the mold made and the teeth set up in such wax, then tried in the mouth on wax to see if they fit, and after having tried the wax plate it is necessary to flask the set of teeth with plaster in order to get a mold in which to pack the rubber. The process is further carried out by placing the mold in boiling water to get the result. By the use of my process, as above described you simply use my rubber as wax and it is ready for vulcanization without any packing or by means of pressure or separation, neither does it have to be filed, scraped, or sand-papered after being vulcanized, as the rubber will hold its general form when pressed into shape and come out with a perfectly smooth surface, leaving a thin plate of uniform thickness. It has been further demonstrated, by the use of such a process, it is a guarantee to strength of plate, as the plates will stand much better wear than the ordinary plates now used.

What I claim is—

1. The process of manufacturing plates for artificial teeth, consisting in forming a model, coating the same with a solution of bisulfid of carbon and rubber, taking a sheet of rubber previously treated with bisulfid of carbon and conforming it to the model, attaching teeth for forming indentures therein, removing the said teeth and placing on pink dental rubber for forming the gum, resetting the teeth in their former indentures and vulcanizing said plate, all arranged and performed in the manner herein set forth.

2. The process of manufacturing plates for artificial teeth, consisting in forming a model and coating it with a prepared solution of bisulfid of carbon and suitable rubber, conforming a suitable sheet of rubber to the model which has been previously treated with bisulfid of carbon and submitted to the action of flame; then dipped in dry sulfur and allowed to remain a suitable time and washed in a strong solution of alum-water and then thoroughly dried; and submitting the sheet of rubber to dry heat making a perfect cohesion of the rubber to the model, mounting teeth upon the model, dipping the same in alum-water, removing the same and attaching to the model the gums, heating the model and resetting the teeth and vulcanizing the same, all substantially as herein set forth.

3. The process of manufacturing plates for artificial teeth, consisting in forming a model, coating the same with an adhesive material, taking a sheet of rubber previously treated with bisulfid of carbon and conforming it to the model, placing thereon dental rubber for forming the gum, setting teeth in the said plate on top of said dental rubber and vulcanizing said plate, as described.

4. As an improved article of manufacture, a bisulfid-of-carbon-coated plate formed with depressions to receive teeth, and teeth secured in these depressions by a layer of rubber, as set forth.

In testimony whereof I affix my signature in presence of two witnesses.

HARRY L. FINNELL.

Witnesses:
CHAS. W. LA PORTE,
ROBERT N. McCORMICK.